United States Patent
Sawal et al.

(10) Patent No.: US 12,373,097 B2
(45) Date of Patent: Jul. 29, 2025

(54) MEMORY POOL MANAGEMENT USING A CLOUD PLATFORM

(71) Applicant: Dell Products L.P., Round Rock, TX (US)

(72) Inventors: Vinay Sawal, Fremont, CA (US); Viswanath Ponnuru, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 212 days.

(21) Appl. No.: 18/343,619

(22) Filed: Jun. 28, 2023

(65) Prior Publication Data

US 2025/0004639 A1    Jan. 2, 2025

(51) Int. Cl.
*G06F 3/06* (2006.01)
*H04L 9/40* (2022.01)

(52) U.S. Cl.
CPC .......... *G06F 3/0604* (2013.01); *G06F 3/0631* (2013.01); *G06F 3/0685* (2013.01); *H04L 63/08* (2013.01); *H04L 63/20* (2013.01)

(58) Field of Classification Search
CPC .... G06F 3/0604; G06F 3/0631; G06F 3/0685; H04L 63/08; H04L 63/20
See application file for complete search history.

(56) References Cited

U.S. PATENT DOCUMENTS

| | | | | |
|---|---|---|---|---|
| 5,987,506 | A | * | 11/1999 | Carter ................ G06F 11/0724 711/E12.066 |
| 2003/0014521 | A1 | * | 1/2003 | Elson ....................... H04L 9/40 709/225 |
| 2007/0256073 | A1 | * | 11/2007 | Troung ................. G06F 21/606 718/1 |
| 2018/0307518 | A1 | * | 10/2018 | Imada .................... G06F 3/0683 |
| 2019/0034383 | A1 | * | 1/2019 | Schmisseur ........... G06F 9/4411 |
| 2020/0076826 | A1 | * | 3/2020 | Ford ........................ H04L 63/12 |
| 2021/0019069 | A1 | * | 1/2021 | Sen ........................ G06F 12/122 |
| 2023/0384934 | A1 | * | 11/2023 | Reddy .................... G06F 3/0679 |
| 2025/0005128 | A1 | | 1/2025 | Sawal et al. |
| 2025/0005614 | A1 | | 1/2025 | Sawal et al. |
| 2025/0007898 | A1 | | 1/2025 | Sawal et al. |
| 2025/0007954 | A1 | | 1/2025 | Sawal et al. |

* cited by examiner

*Primary Examiner* — El Hadji M Sall
(74) *Attorney, Agent, or Firm* — Amin, Turocy & Watson, LLP

(57) ABSTRACT

A system can receive, from a remote computer of remote computers, inventory data representative of an inventory, wherein the inventory data indicates that the remote computer is configured to implement a shared memory pool with the remote computers according to a compute express link protocol. The system can receive, from the remote computer, a request to onboard the remote computer, wherein the request adheres to a defined security protocol and data model architecture, and wherein the system is configured to remotely manage the remote computers as part of a hybrid cloud platform that comprises the remote computers. The system can authenticate the remote computer based on the request and according to the defined security protocol and data model architecture. The system can implement the shared memory pool for the remote computers.

20 Claims, 11 Drawing Sheets

800 ↘

(802)

↓

RECEIVING, FROM A REMOTE COMPUTER OF REMOTE COMPUTERS, INVENTORY DATA REPRESENTATIVE OF AN INVENTORY, WHEREIN THE INVENTORY DATA INDICATES THAT THE REMOTE COMPUTER IS CONFIGURED TO IMPLEMENT A SHARED MEMORY POOL WITH THE REMOTE COMPUTERS ACCORDING TO A COMPUTE EXPRESS LINK PROTOCOL 804

↓

RECEIVING, FROM THE REMOTE COMPUTER, A REQUEST TO ONBOARD THE REMOTE COMPUTER, WHEREIN THE REQUEST ADHERES TO A DEFINED SECURITY PROTOCOL AND DATA MODEL ARCHITECTURE, AND WHEREIN THE SYSTEM IS CONFIGURED TO REMOTELY MANAGE THE REMOTE COMPUTERS AS PART OF A HYBRID CLOUD PLATFORM THAT COMPRISES THE REMOTE COMPUTERS 806

↓

AUTHENTICATING THE REMOTE COMPUTER BASED ON THE REQUEST AND ACCORDING TO THE DEFINED SECURITY PROTOCOL AND DATA MODEL ARCHITECTURE 808

↓

IMPLEMENTING THE SHARED MEMORY POOL FOR THE REMOTE COMPUTERS 810

RECEIVING AN INVENTORY FROM A REMOTE COMPUTER OF REMOTE COMPUTERS, WHEREIN THE INVENTORY INDICATES THAT THE REMOTE COMPUTER IS CONFIGURED TO APPLY A SHARED MEMORY POOL TO THE REMOTE COMPUTERS 904

RECEIVING A REQUEST FROM THE REMOTE COMPUTER TO ONBOARD THE REMOTE COMPUTER, WHEREIN THE REQUEST ADHERES TO A SPECIFIED SECURITY PROTOCOL AND DATA MODEL ARCHITECTURE, WHEREIN THE SYSTEM IS CONFIGURED TO REMOTELY MANAGE THE REMOTE COMPUTERS AS PART OF A HYBRID CLOUD PLATFORM THAT COMPRISES THE REMOTE COMPUTERS 906

AUTHENTICATING THE REMOTE COMPUTER BASED ON THE REQUEST AND ACCORDING TO THE SPECIFIED SECURITY PROTOCOL AND DATA MODEL ARCHITECTURE 908

FACILITATING APPLICATION OF THE SHARED MEMORY POOL TO THE REMOTE COMPUTERS 910

RECEIVING AN INVENTORY FROM A REMOTE COMPUTER OF REMOTE COMPUTERS, WHEREIN THE INVENTORY INDICATES THAT THE REMOTE COMPUTER IS CONFIGURED TO IMPLEMENT A SHARED MEMORY POOL WITH THE REMOTE COMPUTERS 1004

RECEIVING A REQUEST FROM THE REMOTE COMPUTER TO ONBOARD THE REMOTE COMPUTER, WHEREIN THE SYSTEM IS CONFIGURED TO REMOTELY MANAGE THE REMOTE COMPUTERS AS PART OF A HYBRID CLOUD PLATFORM THAT COMPRISES THE REMOTE COMPUTERS 1006

AUTHENTICATING THE REMOTE COMPUTER BASED ON THE REQUEST 1008

IMPLEMENTING THE SHARED MEMORY POOL FOR THE REMOTE COMPUTERS 1010

FIG. 10

MEMORY POOL MANAGEMENT USING A CLOUD PLATFORM

BACKGROUND

Computer systems can be managed remotely.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive, from a remote computer of remote computers, inventory data representative of an inventory, wherein the inventory data indicates that the remote computer is configured to implement a shared memory pool with the remote computers according to a compute express link protocol. The system can receive, from the remote computer, a request to onboard the remote computer, wherein the request adheres to a defined security protocol and data model architecture, and wherein the system is configured to remotely manage the remote computers as part of a hybrid cloud platform that comprises the remote computers. The system can authenticate the remote computer based on the request and according to the defined security protocol and data model architecture. The system can implement the shared memory pool for the remote computers.

An example method can comprise receiving, by a system comprising a processor, an inventory from a remote computer of remote computers, wherein the inventory indicates that the remote computer is configured to apply a shared memory pool to the remote computers. The method can further comprise receiving, by the system, a request from the remote computer to onboard the remote computer, wherein the request adheres to a specified security protocol and data model architecture, wherein the system is configured to remotely manage the remote computers as part of a hybrid cloud platform that comprises the remote computers. The method can further comprise authenticating, by the system, the remote computer based on the request and according to the specified security protocol and data model architecture. The method can further comprise facilitating, by the system, application of the shared memory pool to the remote computers.

An example non-transitory computer-readable medium can comprise instructions that, in response to execution, cause a system comprising a processor to perform operations. These operations can comprise receiving an inventory from a remote computer of remote computers, wherein the inventory indicates that the remote computer is configured to implement a shared memory pool with the remote computers. These operations can further comprise receiving a request from the remote computer to onboard the remote computer, wherein the system is configured to remotely manage the remote computers as part of a hybrid cloud platform that comprises the remote computers. These operations can further comprise authenticating the remote computer based on the request. These operations can further comprise implementing the shared memory pool for the remote computers.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates an example process flow that can facilitate memory pool management using a cloud platform, in accordance with an embodiment of this disclosure;

FIG. 9 illustrates an example process flow that can facilitate memory pool management using a cloud platform, in accordance with an embodiment of this disclosure;

FIG. 10 illustrates an example process flow that can facilitate memory pool management using a cloud platform, in accordance with an embodiment of this disclosure;

DETAILED DESCRIPTION

Overview

Figure 1:
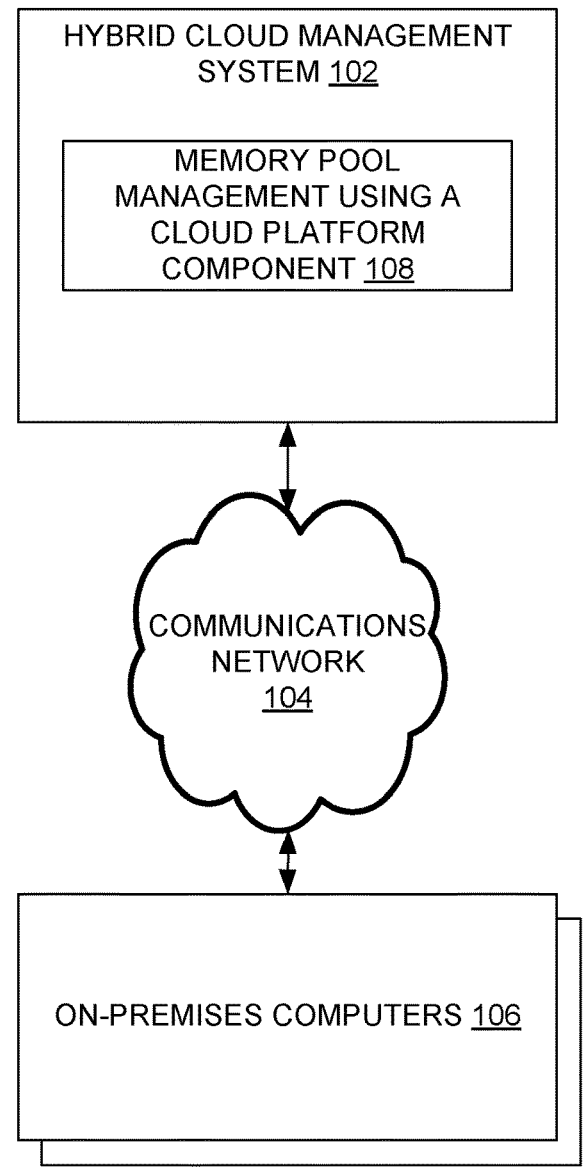
FIG. 1 illustrates an example system architecture that can facilitate memory pool management using a cloud platform, in accordance with an embodiment of this disclosure.

The present techniques generally relate to information handling systems, and more particularly relate to providing secure memory fabric management of a cloud computing cluster using cloud security policy and compliance.

As the value and use of information continues to increase, individuals and businesses can seek additional ways to process and store information. One option available to users can be Information Handling Systems (IHSs). An IHS generally processes, compiles, stores, and/or communicates information or data for business, personal, or other purposes, thereby allowing users to take advantage of the value of the information. Because technology and information handling needs and requirements can vary between different users or applications, IHSs can also vary regarding what information is handled, how the information is handled, how much information is processed, stored, or communicated, and how quickly and efficiently the information may be processed, stored, or communicated. The variations in IHSs can allow for IHSs to be general or configured for a specific user or specific use such as financial transaction processing, airline reservations, enterprise data storage, or global communications. In addition, IHSs can include a variety of hardware and software components that can be configured to process, store, and communicate information and can include one or more computer systems, data storage systems, and networking systems.

A compute express link protocol can generally comprise a standard for high-speed and high-capacity connections between processors and devices, and processors and memory.

A compute express link protocol switching infrastructure can create a composable fabric between different types of memory devices and different types of compute engines.

Some approaches to switching infrastructure can create a composable fabric across compute, memory, and storage of computers.

The present techniques can be implemented to facilitate management and orchestration of compute express link protocol memory-pool-capable multi-cluster devices and appliance management within a hybrid cloud management platform.

The present techniques can be implemented to facilitate compute express link protocol-based application programming interface (API) resource management using a hybrid cloud management platform's connectivity component APIs to facilitate managing compute express link protocol memory pool infrastructure.

The present techniques can be implemented to facilitate a compute express link protocol memory device abstraction and hybrid cloud management platform memory pool manager interface via a client component on managed computers that facilitates cluster configuration compliance across compute express link-supported capable hardware infrastructure.

The present techniques can be implemented to enforce hybrid cloud management platform security across disaggregated hardware devices for configuration updates, monitoring, and security incident management on authenticated computing devices and memory fabric.

The present techniques can be implemented to facilitate cluster-level compute express link protocol memory pool configurations and monitoring from a hybrid cloud management platform console based on hybrid cloud management platform security policies.

The present techniques can be implemented to facilitate disaggregating data-center-specific hardware that can include solutions tied to firmware, software, and hardware ecosystems. Such an approach can reduce capital expenditure and operating expenditure expenses in private cloud and/or hybrid cloud deployments.

The present techniques can be implemented to facilitate configuration and monitoring of a cluster-level secure compute express link protocol memory pool from a cloud console of a hybrid cloud management platform.

The present techniques can be implemented to facilitate enforcing a hybrid cloud management platform across disaggregated hardware devices for config updates, monitoring, incident management on authenticated device memory fabric.

Example Architectures

FIG. 1 illustrates an example system architecture 100 that can facilitate memory pool management using a cloud platform, in accordance with an embodiment of this disclosure.

System architecture 100 comprises hybrid cloud management system 102, communications network 104, and on-premises computers 106. In turn, hybrid cloud management system 102 comprises memory pool management using a cloud platform component 108.

Figure 11:
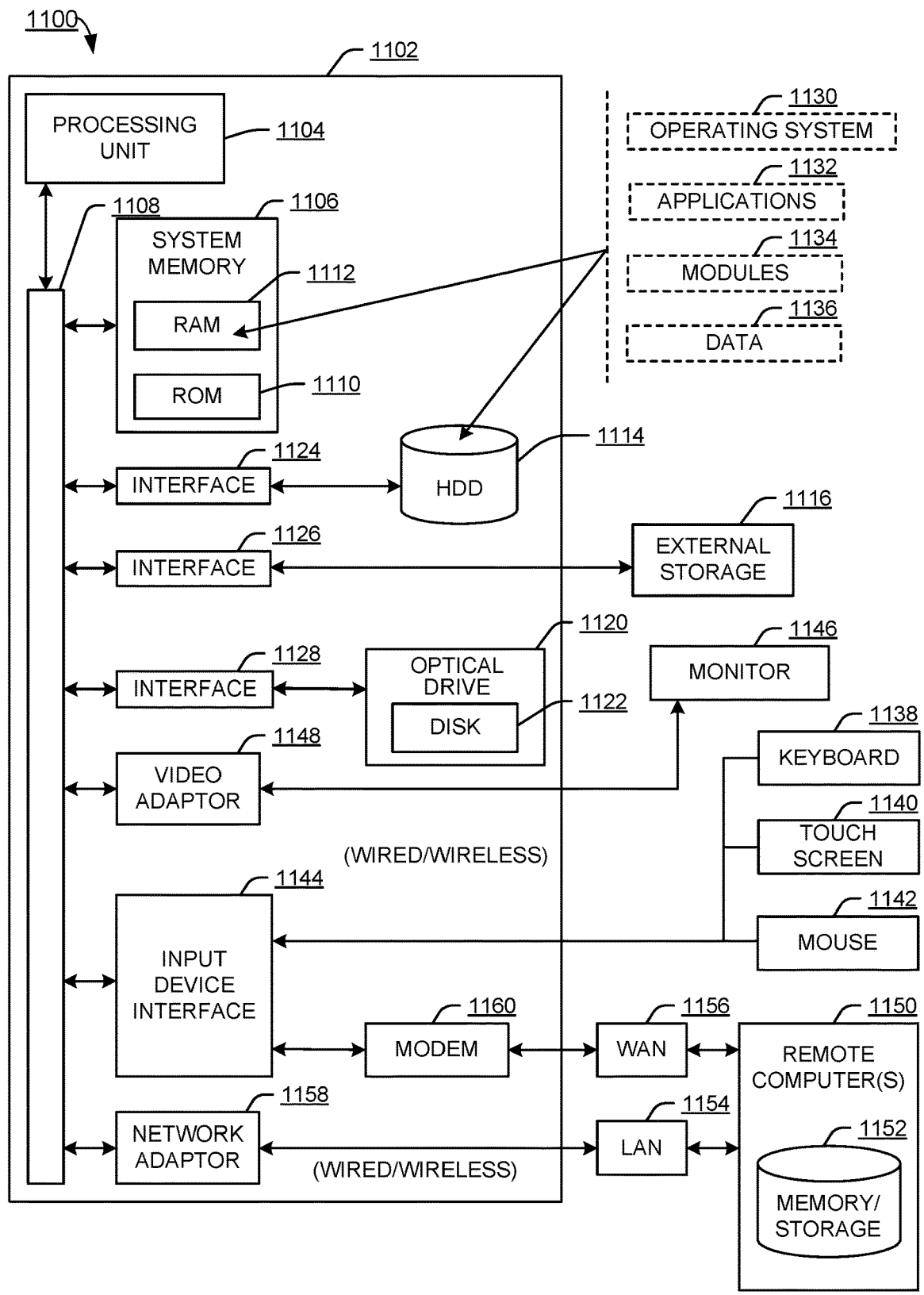
FIG. 11 illustrates an example block diagram of a computer operable to execute an embodiment of this disclosure.

Each of hybrid cloud management system 102 and/or on-premises computers 106 can be implemented with part(s) of computing environment 1100 of FIG. 11. Communications network 104 can comprise a computer communications network, such as the Internet.

On-premises computers 106 can comprise one or more computers that are installed on a customer's premises and are (or are to be) managed by hybrid cloud management system 102. As part of that, hybrid cloud management system 102 can create a shared memory pool from computers of on-premises computers, such as according to a shared memory pool according to a compute express link protocol.

A compute express link protocol can generally facilitate high-speed and high-capacity processor-to-device and processor-to-memory connections. A shared memory pool can generally comprise the computer memory of multiple computers that is logically presented as one memory resource, and that can be accessed by multiple computers.

In some examples, memory pool management using a cloud platform component 108 can implement part(s) of the process flows of FIGS. 8-10 to implement memory pool management using a cloud platform.

It can be appreciated that system architecture 100 is one example system architecture for memory pool management using a cloud platform, and that there can be other system architectures that facilitate memory pool management using a cloud platform.

Figure 2:
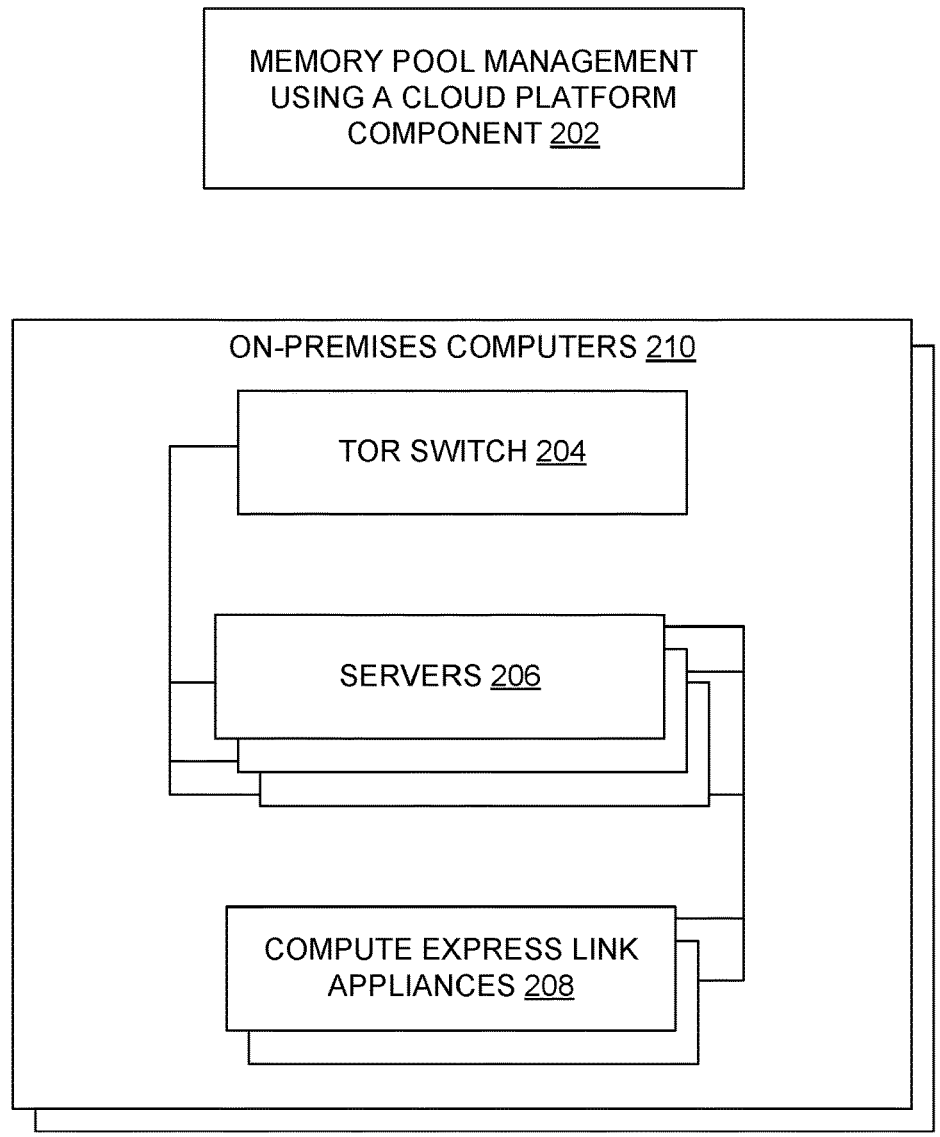
FIG. 2 illustrates another example system architecture that can facilitate memory pool management using a cloud platform, in accordance with an embodiment of this disclosure.

FIG. 2 illustrates another example system 200 architecture that can facilitate memory pool management using a cloud platform, in accordance with an embodiment of this disclosure. In some examples, part(s) of system architecture 200 can be used to implement part(s) of system architecture 100 of FIG. 1.

System architecture 200 comprises memory pool management using a cloud platform component 202 (which can be similar to memory pool management using a cloud platform component 108 of FIG. 1) and on-premises computers 210 (which can be similar to on-premises computers 106). In turn, a computer of on-premises computers 210 comprises top-of-rack (TOR) switch 204, servers 206, and compute express link appliances 208. TOR switch 204 can comprise networking infrastructure so that servers 206 can communicate with each other. Servers 206 can be connected to compute express link appliances 208, which can be computing devices that can be accessed according to a compute express link, such as devices that comprise computer memory.

Memory pool management using a cloud platform component 202 can communicate with on-premises computers 210 to create and manage a shared memory pool on on-premises computers 210.

Figure 3:
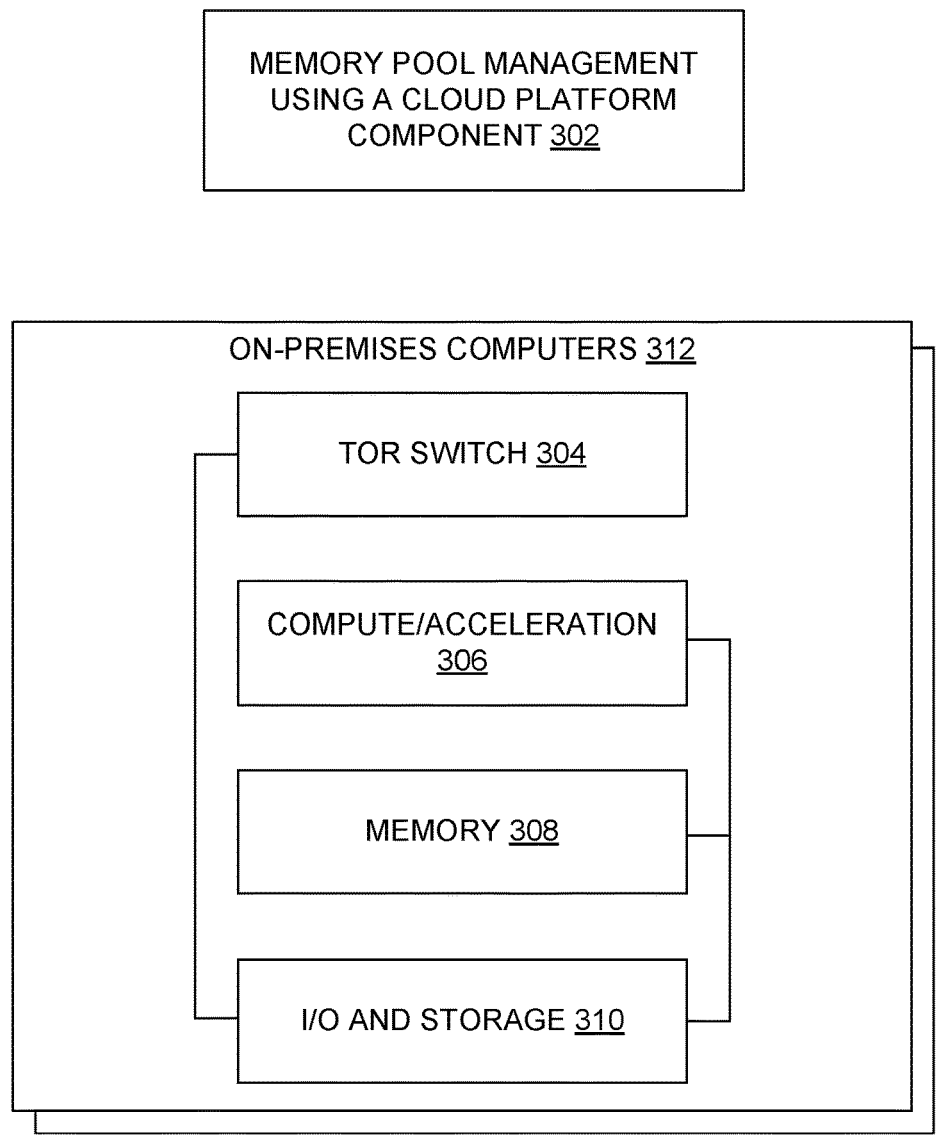
FIG. 3 illustrates another example system architecture that can facilitate memory pool management using a cloud platform, in accordance with an embodiment of this disclosure.

FIG. 3 illustrates another example system architecture 300 that can facilitate memory pool management using a cloud platform, in accordance with an embodiment of this disclosure. In some examples, part(s) of system architecture 300 can be used to implement part(s) of system architecture 100 of FIG. 1.

System architecture 300 comprises memory pool management using a cloud platform component 302 (which can be similar to memory pool management using a cloud platform component 108 of FIG. 1) and on-premises computers 312 (which can be similar to on-premises computers 106). In turn, a computer of on-premises computers 312 comprises TOR switch 304 (which can be similar to TOR switch 204 of FIG. 2), compute/acceleration 306, memory 308, and input/output (I/O) and storage 310. Each of compute/acceleration 306, memory 308, and input/output (I/O) and storage 310 can be computing devices that comprise compute or hardware acceleration resources, memory resources, I/O resources, and storage resources, respectively.

Similar to as in FIG. 2, memory pool management using a cloud platform component 302 can communicate with on-premises computers 312 to create and manage a shared memory pool on on-premises computers 312. System architecture 200 of FIG. 2 and system architecture 300 present different example architectures in which memory pool management using a cloud platform can be implemented.

Figure 4:
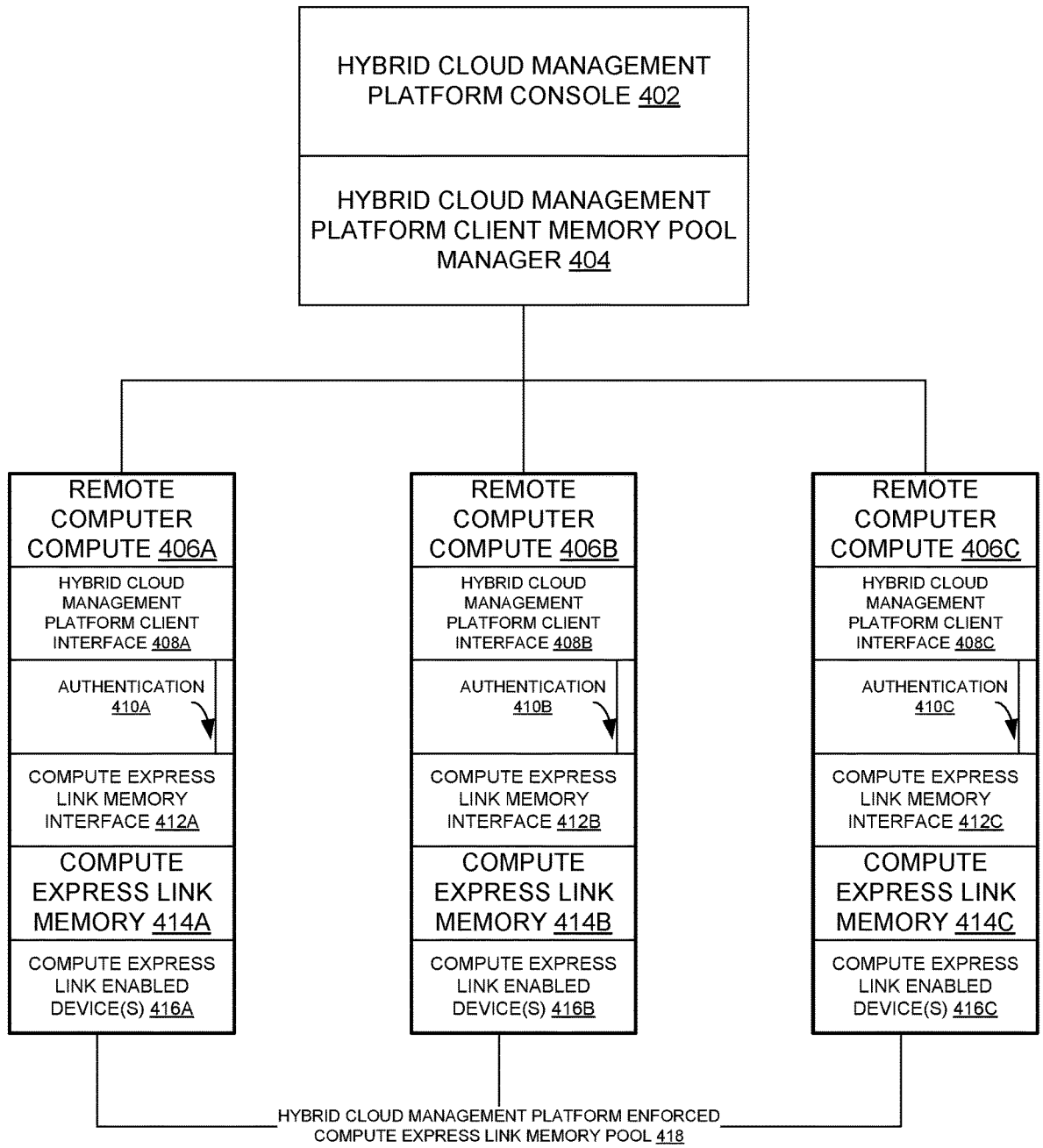
FIG. 4 illustrates another example system architecture that can facilitate memory pool management using a cloud platform, in accordance with an embodiment of this disclosure.

FIG. 4 illustrates another example system architecture 400 that can facilitate memory pool management using a cloud platform, in accordance with an embodiment of this disclosure. In some examples, part(s) of system architecture 400 can be used to implement part(s) of system architecture 100 of FIG. 1.

System architecture 400 comprises hybrid cloud management platform console 402, hybrid cloud management platform client memory pool manager 404, remote computer compute 406A, hybrid cloud management platform client interface 408A, authentication 410A, compute express link memory interface 412A, compute express link memory 414A, compute express link enabled device(s) 416A, remote computer compute 406B, hybrid cloud management platform client interface 408B, authentication 410B, compute express link memory interface 412B, compute express link memory 414B, compute express link enabled device(s) 416B, remote computer compute 406C, hybrid cloud management platform client interface 408C, authentication 410C, compute express link memory interface 412C, compute express link memory 414C, compute express link enabled device(s) 416C, and hybrid cloud management platform enforced compute express link memory pool 418.

In some examples, memory pool management using a cloud platform component 108 of FIG. 1 can comprise hybrid cloud management platform console 402 (which can provide an interface to remote accounts to manage a hybrid cloud) hybrid cloud management platform client memory pool manager 404 (which can perform memory pool management functions).

One computer can comprise remote computer compute 406A, hybrid cloud management platform client interface 408A, authentication 410A, compute express link memory interface 412A, compute express link memory 414A, and compute express link enabled device(s) 416A. Another computer can comprise remote computer compute 406B, hybrid cloud management platform client interface 408B, authentication 410B, compute express link memory interface 412B, compute express link memory 414B, and compute express link enabled device(s) 416B. A third computer can comprise remote computer compute 406C, hybrid cloud management platform client interface 408C, authentication 410C, compute express link memory interface 412C, compute express link memory 414C, compute express link enabled device(s) 416C.

Hybrid cloud management platform enforced compute express link memory pool 418 can link compute express link memory 414A, compute express link memory 414B, and compute express link memory 414C to form a memory pool, as directed by hybrid cloud management platform console 402 and hybrid cloud management platform client memory pool manager 404. On each computer, this can be facilitated by compute express link memory interface 412A, compute express link memory interface 412B, and compute express link memory interface 412C, respectively.

System architecture 400 can be used to implement a memory pool manager and interface to a client connectivity module that can facilitate memory cluster configuration management and compliance across compute express link-supported capable memory hardware.

Figure 5:
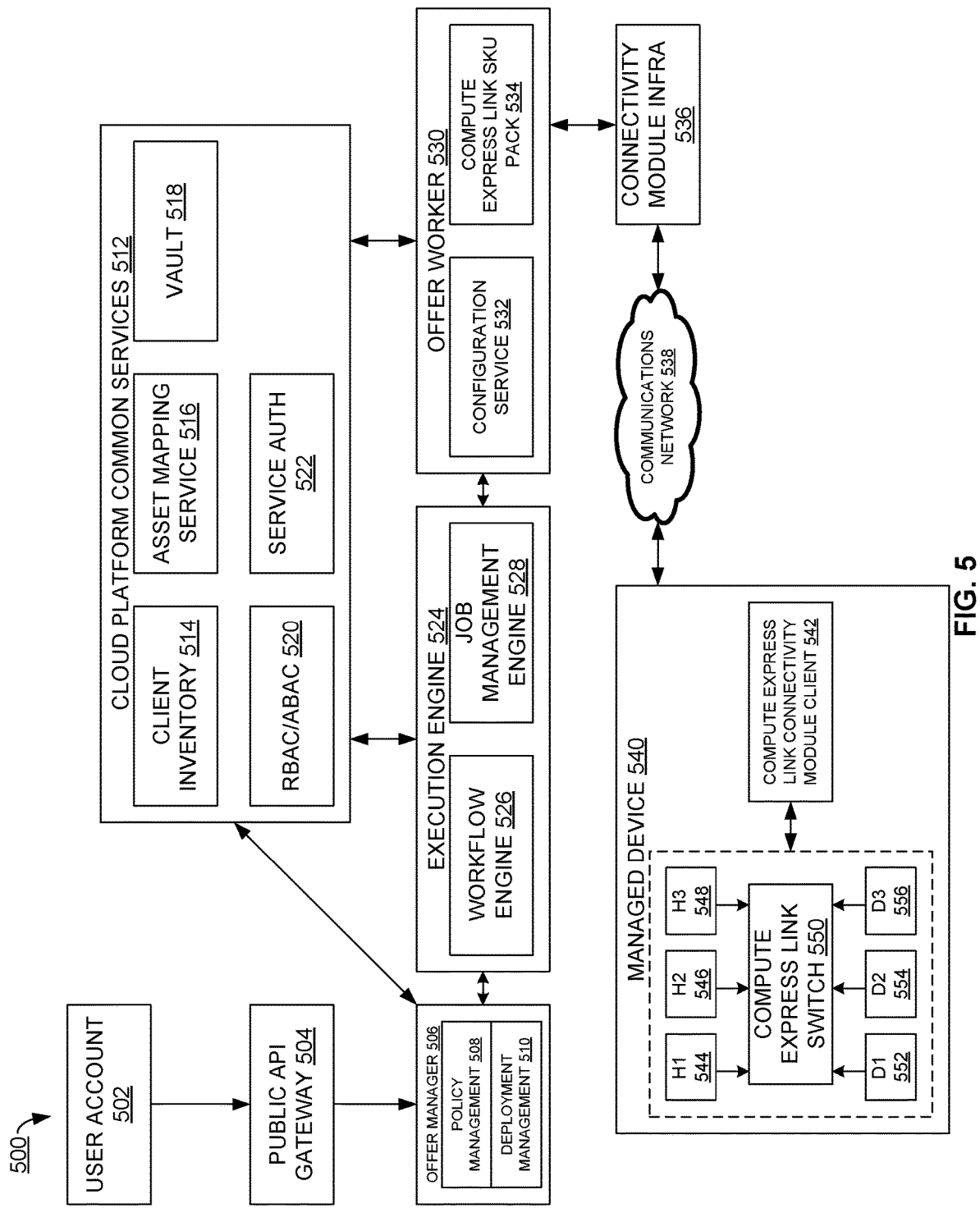
FIG. 5 illustrates another example system architecture that can facilitate memory pool management using a cloud platform, in accordance with an embodiment of this disclosure.

FIG. 5 illustrates another example system architecture 500 that can facilitate memory pool management using a cloud platform, in accordance with an embodiment of this disclosure. In some examples, part(s) of system architecture 500 can be used to implement part(s) of system architecture 100 of FIG. 1.

System architecture 500 comprises user account 502, public application programming interface (API) gateway 504, offer manager 506 (which comprises policy management 508 and deployment management 510), cloud platform common services 512 (which comprises client inventory 514, asset mapping service 516, vault 518, role-based access control/attribute-based access control (RBAC/ABAC) 520, and service authorization 522), execution engine 524 (which comprises workflow engine 526 and job management engine 528), offer worker 530 (which comprises configuration service 532 and compute express link stock keeping unit (SKU) pack 534), connectivity module 536, communications network 538, and managed device 540 (which comprises compute express link connectivity module client 542, host H1 544, host H2 546, host H3 548, compute express link switch 550, device D1 552 (which can be similar to compute express link enabled device(s) 416A of FIG. 4), device D2 554, and device D3 556).

In system architecture 500, user account 502 can subscribe to a hybrid cloud management service that comprises managed device 540, and have a shared memory pool created that includes memory of managed device 540.

In some examples, respective message busses can connect offer manager 506 and execution engine 524, and execution engine 524 and offer worker 530.

User account 502 can comprise a user account associated with a customer (or consumer) that is used by a cloud service provider for authentication and authorization. Public API gateway 504 can comprise an API gateway to route API requests from outside to an appropriate service. Offer manager 506 can provide subscription-specific management functions. Policy management 508 can comprise a service to manage policies associated with each client. Deployment management 510 can comprise a service to manage equipment deployed at the client location.

Cloud platform common services 512 can comprise common services across all subscriptions/offers. Client inventory 514 can comprise a database of equipment located at a client data center. Asset mapping service 516 can comprise a service that provides a mapping between a client's subscription-id and a client inventory at the client data center. Vault 518 can comprise storage to store secrets (e.g., user IDs and passwords, and/or certificates). RBAC/ABAC 520 can comprise an access control engine for role-based and attribute-based access. Service authorization 522 can comprise a function to provide service-to-service authentication.

Execution engine 524 can comprise an orchestration engine to manage workflow execution. Workflow engine 526 can comprise an engine that manages client/user-initiated workflows. Job management engine 528 can comprise a service to manage asynchronous jobs.

Offer worker 530 can perform subscription-specific services. Configuration service 532 can manage desired state configuration on each device/equipment. compute express link SKU pack 534 can comprise vendor-specific drivers to manage CXL devices at a client location.

Connectivity module infra 536 can comprise infrastructure to provide connectivity between a cloud and managed devices. Managed device 540 can comprise a device at a client location that is being managed by a cloud services platform.

System architecture 500 can comprise components within a cloud and managed-device infrastructure at an on-premises location that can connect to a cloud management system, and leverage cloud connectivity module infrastructure.

Example Signal Flows

Figure 6:
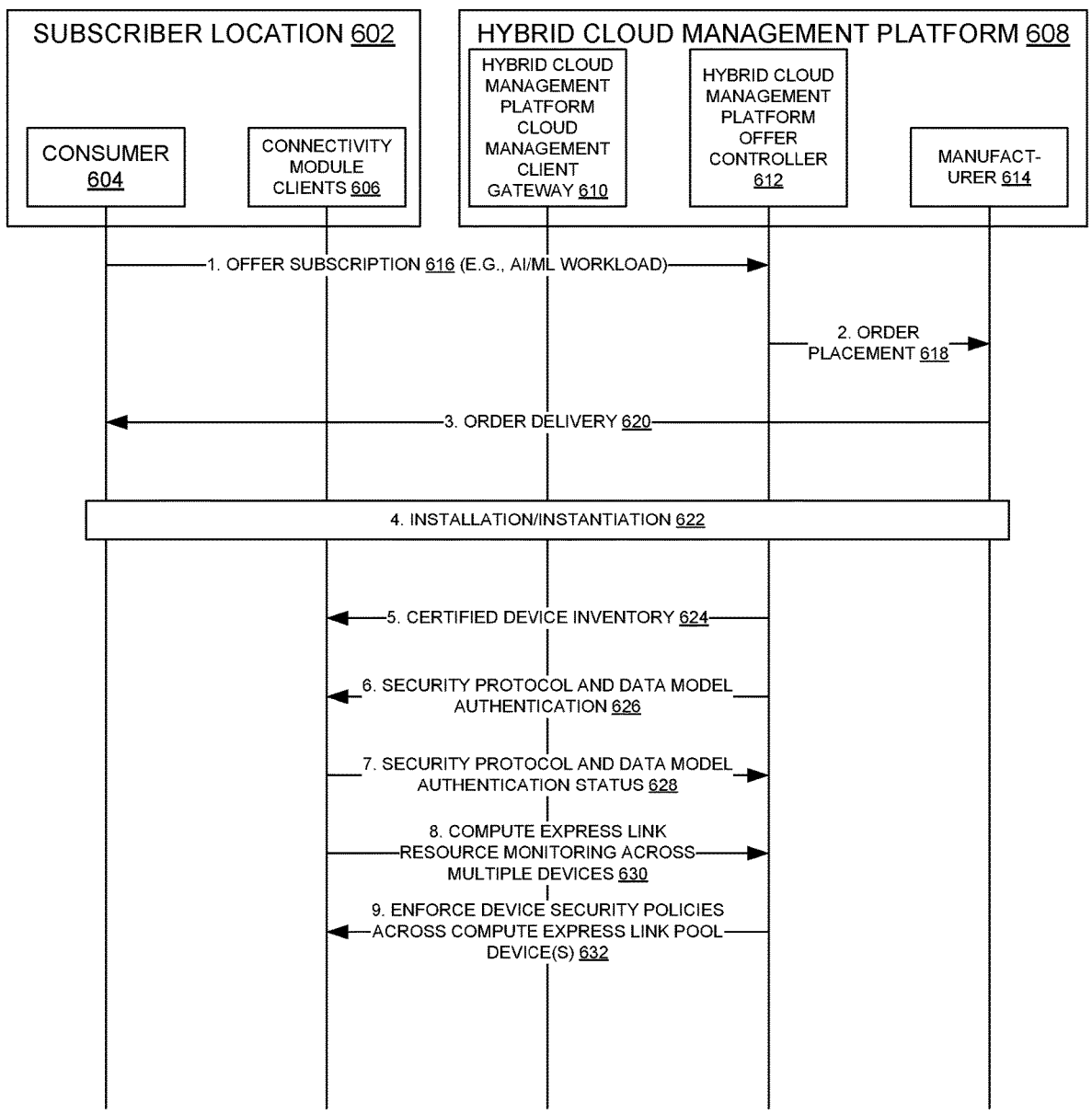
FIG. 6 illustrates an example signal flow that can facilitate memory pool management using a cloud platform, in accordance with an embodiment of this disclosure.

FIG. 6 illustrates an example signal flow 600 that can facilitate memory pool management using a cloud platform, in accordance with an embodiment of this disclosure. In some examples, one or more embodiments of process flow 400 can be implemented by memory pool management using a cloud platform component 108 of FIG. 1, or computing environment 1100 of FIG. 11.

Signal flow 600 comprises signals sent between and within subscriber location 602 (which comprises consumer 604 and connectivity module clients 606) and hybrid cloud management platform 608 (which comprises hybrid cloud management platform connectivity module client gateway 610, hybrid cloud management platform offer controller 612, and manufacturer 614).

The example signals of signal flow 600 are as follows. Consumer 604 sends offer subscription 616 (e.g., AI/ML workload) to hybrid cloud management platform offer controller 612. Hybrid cloud management platform offer controller 612 sends order placement 618 to manufacturer 614. Manufacturer 614 sends order delivery 620 to consumer 604 (which can comprise physically transferring a computer manufactured by manufacturer 614 to an on-premises site of consumer 604). Installation/instantiation 622 can be performed to install and instantiate the computer of order delivery 620. This can comprise a consumer installing the hardware, performing device initialization, and establishing a secure connection with a cloud services platform.

Hybrid cloud management platform offer controller 612 sends certified device inventory 624 to connectivity module clients 606. Hybrid cloud management platform offer controller 612 sends security protocol and data model authentication 626 to connectivity module clients 606. This can involve determining whether the device being onboarded is certified for use with hybrid cloud management platform 608.

Connectivity module clients 606 sends security protocol and data model authentication status 628 to hybrid cloud management platform offer controller 612. Connectivity module clients 606 sends compute express link resource monitoring across multiple devices 630 to hybrid cloud management platform offer controller 612. Hybrid cloud management platform offer controller 612 sends enforce device security policies across compute express link pool device(s) 632 to connectivity module clients 606.

In this manner, consumer 604 can subscribe to a hybrid cloud management platform that incorporates a shared memory pool.

In general, 616-620 can comprise offering subscription suggestions based on workload types (e.g., artificial intelligence/machine learning (AI/ML), scientific, security engine). In general, 624-628 can comprise validating and authenticating endpoint devices using security protocol data model specifications to verify hybrid cloud management platform-approved devices that participate in hybrid cloud management platform device configurations. The security policies can be governed by an offer controller of the hybrid cloud management platform. In general, 630-632 can comprise memory pool configuration and monitoring across multiple remote computers and cluster-level isolations. This can comprise enforcing security policies across a compute express link pool of devices.

Process flow 600 can generally comprise a high-level workflow system between a cloud management system and a managed-device infrastructure at an on-premises location that performs authentication and/or authorizations of devices in an onboarding scenario, to further manage a memory pool's configuration and compliance, by enforcing cloud security policies that can be unique to each tenant/consumer.

Figure 7:
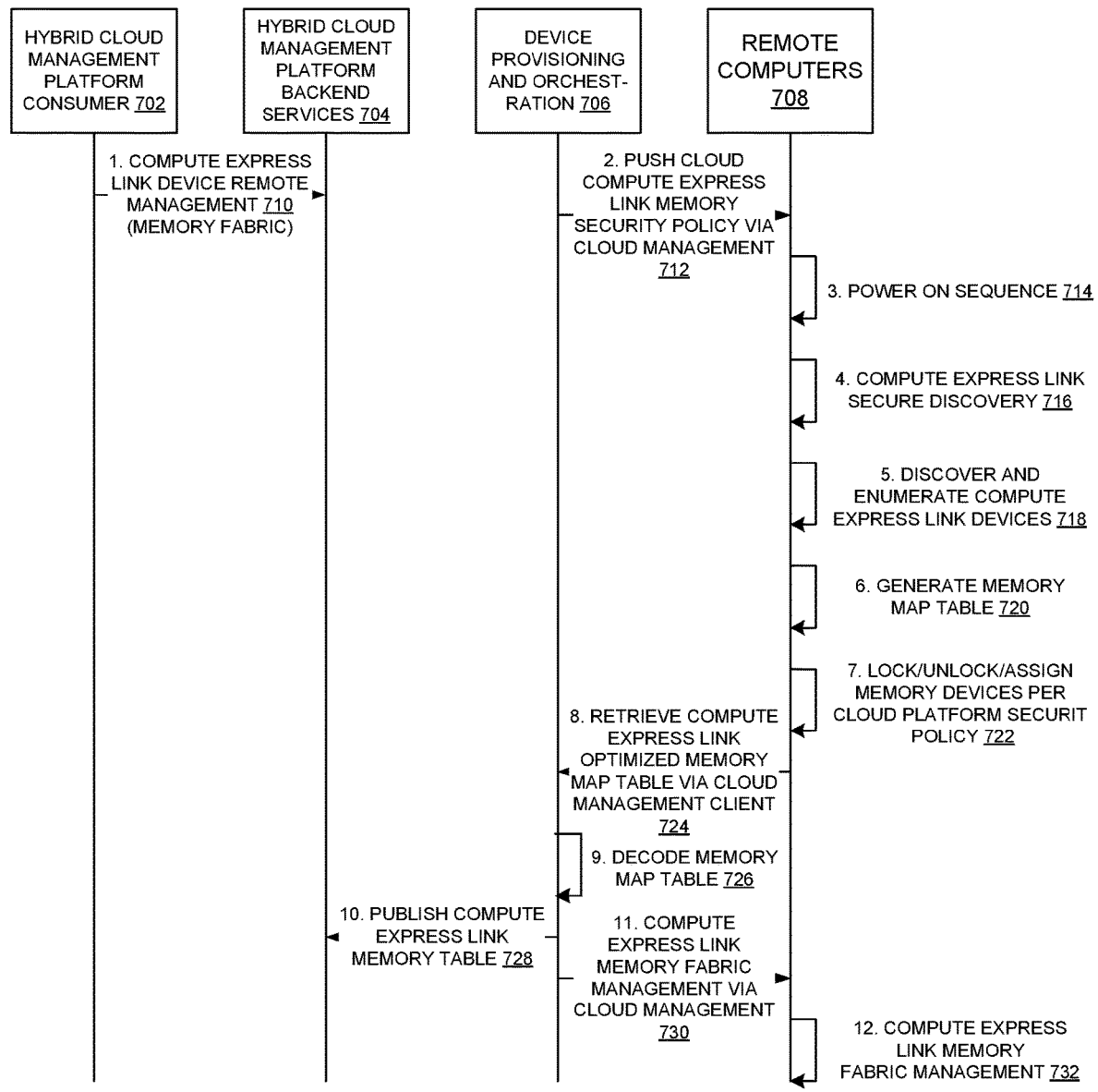
FIG. 7 illustrates another example signal flow that can facilitate memory pool management using a cloud platform, in accordance with an embodiment of this disclosure.

FIG. 7 illustrates another example signal flow 700 that can facilitate memory pool management using a cloud platform, in accordance with an embodiment of this disclosure. In some examples, one or more embodiments of process flow 400 can be implemented by memory pool management using a cloud platform component 108 of FIG. 1, or computing environment 1100 of FIG. 11.

Signal flow 600 comprises signals sent between hybrid cloud management platform consumer 702, hybrid cloud management platform backend services 704, device provisioning and orchestration 706, and remote computers 708.

The example signals of signal flow 700 are as follows. Hybrid cloud management platform consumer 702 sends compute express link device remote management 710 (memory fabric) to hybrid cloud management platform backend services 704. Device provisioning and orchestration 706 sends push cloud compute express link memory security policy via cloud management 712 to remote computers 708.

Remote computers 708 performs power on sequence 714; compute express link secure discovery 716 (which can involve a basic input output system (BIOS) of the computer utilizing a security protocol and data model standard and/or a management component transport protocol); discover and enumerate compute express link devices 718 (which can involve a BIOS of the computer); generate memory map table 720 (which can involve a BIOS of the computer, and result in creating a JavaScript Object Notation (JSON) formatted encoded binary mapping); and lock/unlock/assign memory devices per cloud platform security policy 722 (which can be performed by a hardware remote access controller).

Remote computers 708 sends retrieve compute express link optimized memory map table via connectivity module client 724 to device provisioning and orchestration 706. Device provisioning and orchestration 706 performs decode memory map table 726 (from a JSON format). Device provisioning and orchestration 706 sends publish compute express link memory table 728 to hybrid cloud management platform backend services 704. Device provisioning and orchestration 706 sends compute express link memory fabric management via cloud management 730 (for compute express link devices) to remote computers 708. Remote computers 708 performs compute express link memory fabric management 732 (which can utilize a security protocol and data model standard and/or a management component transport protocol).

In this manner, hybrid cloud management platform consumer 702 can subscribe to a hybrid cloud management platform that incorporates a shared memory pool of remote computers 708.

Process flow 700 can generally be implemented to facilitate remote management of memory fabric security via a cloud management system that can include discovery, and enumerating devices securely at a BIOS. Via system architecture 700, a secure mapping table can be created that comprises trusted/authenticated memory devices, and security policies can be enforced such that devices that are not trusted or that are un-authenticated are denied participation in a memory pool to prevent security risks.

Example Process Flows

FIG. 8 illustrates an example process flow 800 for memory pool management using a cloud platform, in accordance with an embodiment of this disclosure. In some examples, one or more embodiments of process flow 800 can be implemented by memory pool management using a cloud platform component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts receiving, from a remote computer of remote computers, inventory data representative of an inventory, where the inventory data indicates that the remote computer is configured to implement a shared memory pool with the remote computers according to a compute express link protocol. In some examples, operation 804 can be implemented in a similar manner as certified device inventory 624 of FIG. 6.

After operation 804, process flow 800 moves to operation 806.

Operation 806 depicts receiving, from the remote computer, a request to onboard the remote computer, where the request adheres to a defined security protocol and data model architecture, and where the system is configured to remotely manage the remote computers as part of a hybrid cloud platform that comprises the remote computers. In some examples, operation 806 can be implemented in a similar manner as security protocol and data model authentication 626 of FIG. 6.

In some examples, receiving the request from the remote computer to onboard the remote computer is performed in response to the remote computer being powered on. This can be similar to 3. power on sequence 714 of FIG. 7.

In some examples, operation 806 comprises sending the remote computer a hybrid cloud memory security policy, where the remote computer is configured to implement the device security policy (of operation 810) based on the hybrid cloud memory security policy. This can be similar to push cloud compute express link memory security policy via cloud management 712 of FIG. 7. In some examples, the sending of the memory security policy to the remote computer is performed after the authenticating of the remote computer. That is, the authentication of operation 806 can occur before sending the remote computer the hybrid cloud memory security policy After operation 806, process flow 800 moves to operation 808.

Operation 808 depicts authenticating the remote computer based on the request and according to the defined security protocol and data model architecture. In some examples, operation 806 can be implemented in a similar manner as security protocol and data model authentication status 628 of FIG. 6.

After operation 808, process flow 800 moves to operation 810.

Operation 810 depicts implementing the shared memory pool for the remote computers. In some examples, operation 806 can be implemented in a similar manner as compute express link resource monitoring across multiple devices 630 of FIG. 6.

In some examples, operation 810 comprises enforcing a device security policy that applies to the shared memory pool across the remote computers. This can be similar to enforce device security policies across compute express link pool device(s) 632 of FIG. 6.

In some examples, operation 810 comprises contacting a fabric management component of the remote computer, and where the fabric management component is configured to communicate with respective remote computers of the remote computers regarding the shared memory pool. This can be similar to compute express link memory fabric management via cloud management 730 of FIG. 7.

In some examples, operation 810 comprises receiving an indication of a memory map table of the remote computer from the remote computer, where the memory map table identifies authenticated devices for participation in memory pool configurations, and where the implementing of the shared memory pool for the remote computers is performed based on the indication of the memory map table. This can be similar to generate memory map table 720 of FIG. 7.

In some examples, a memory map table (sometimes referred to as a memory pool table) can identify memory devices discovered based on a hybrid cloud management platform memory security policy that includes only authenticated devices participation in the memory pool configurations. It can be that unauthenticated devices are in quarantine by setting the device state to lock as per a hybrid cloud management platform memory pool security policy.

In some examples, operation 810 comprises decoding the indication of the memory map table to produce a decoded memory map table, and where the implementing of the shared memory pool for the remote computers is performed based on the decoded memory map table.

This can be similar to decode memory map table 726 of FIG. 7.

In some examples, the indication of the memory map table comprises a JavaScript object notation format, and the decoded memory map table comprises a second format that differs from the JavaScript object notation format.

After operation 810, process flow 800 moves to 812, where process flow 800 ends.

FIG. 9 illustrates an example process flow 900 for memory pool management using a cloud platform, in accordance with an embodiment of this disclosure. In some examples, one or more embodiments of process flow 900 can be implemented by memory pool management using a cloud platform component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904.

Operation 904 depicts receiving an inventory from a remote computer of remote computers, where the inventory indicates that the remote computer is configured to apply a shared memory pool to the remote computers. In some examples, operation 904 can be implemented in a similar manner as operation 804 of FIG. 8.

After operation 904, process flow 900 moves to operation 906.

Operation 906 depicts receiving a request from the remote computer to onboard the remote computer, where the request adheres to a specified security protocol and data model architecture, where the system is configured to remotely manage the remote computers as part of a hybrid cloud platform that comprises the remote computers. In some examples, operation 906 can be implemented in a similar manner as operation 806 of FIG. 8.

After operation 906, process flow 900 moves to operation 908.

Operation 908 depicts authenticating the remote computer based on the request and according to the specified security protocol and data model architecture In some examples, operation 908 can be implemented in a similar manner as operation 808 of FIG. 8.

After operation 908, process flow 900 moves to operation 910.

Operation 910 depicts facilitating application of the shared memory pool to the remote computers. In some examples, operation 910 can be implemented in a similar manner as operation 810 of FIG. 8.

In some examples, operation 910 comprises updating a configuration of the shared memory pool. In some examples, operation 910 comprises monitoring the shared memory pool. In some examples, operation 910 comprises managing a security incident relating to usage of the shared memory pool. That is, the present techniques can be implemented to enforce hybrid cloud management platform security across disaggregated hardware devices for configuration updates, monitoring, and security incident management on authenticated computing devices and memory fabric.

In some examples, the shared memory pool is configured for usage according to a compute express link protocol.

After operation 910, process flow 900 moves to 912, where process flow 900 ends.

FIG. 10 illustrates an example process flow 1000 for memory pool management using a cloud platform, in accordance with an embodiment of this disclosure. In some examples, one or more embodiments of process flow 1000 can be implemented by memory pool management using a cloud platform component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004.

Operation 1004 depicts receiving an inventory from a remote computer of remote computers, where the inventory indicates that the remote computer is configured to implement a shared memory pool with the remote computers. In some examples, operation 1004 can be implemented in a similar manner as operation 804 of FIG. 8.

In some examples, operation 1004 comprises receiving order data indicative of initiating a subscription for the remote computer. This can be similar to order placement 618 of FIG. 6.

After operation 1004, process flow 1000 moves to operation 1006.

Operation 1006 depicts receiving a request from the remote computer to onboard the remote computer, where the system is configured to remotely manage the remote computers as part of a hybrid cloud platform that comprises the remote computers. In some examples, operation 1006 can be implemented in a similar manner as operation 806 of FIG. 8.

In some examples, the request adheres to a security protocol and data model architecture, and where the authenticating of the remote computer based on the request is performed according to the security protocol and data model architecture.

After operation 1006, process flow 1000 moves to operation 1008.

Operation 1008 depicts authenticating the remote computer based on the request. In some examples, operation 1008 can be implemented in a similar manner as operation 808 of FIG. 8.

After operation 1008, process flow 1000 moves to operation 1010.

Operation 1010 depicts implementing the shared memory pool for the remote computers. In some examples, operation 1010 can be implemented in a similar manner as operation 810 of FIG. 8.

In some examples, operation 1010 comprises receiving an encoded binary indication of a memory map table from the remote computer, and where the implementing of the shared memory pool for the remote computers is performed based on the encoded binary indication of the memory map table. This can be similar to generate memory map table 720 of FIG. 7.

In some examples, operation 1010 comprises instructing the remote computer to lock a memory device of the remote computer, to unlock the memory device of the remote computer, or to assign the memory device of the remote computer. This can be similar to lock/unlock/assign memory devices per cloud platform security policy 722 of FIG. 7.

In some examples, the shared memory pool is configured according to a compute express link protocol.

After operation 1010, process flow 1000 moves to 1012, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of hybrid cloud management system 102, and/or on-premises computers 106 of FIG. 1, on-premises computers 210 of FIG. 2, and/or on-premises computers 312 of FIG. 3.

In some examples, computing environment 1100 can implement one or more embodiments of the process flows of FIGS. 8-10 to facilitate memory pool management using a cloud platform.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory coupled to the processor, comprising instructions that, in response to execution by the processor, cause the system to perform operations, comprising:
receiving, from a remote computer of remote computers, inventory data representative of an inventory, wherein the inventory data indicates that the remote computer is configured to implement a shared memory pool with the remote computers according to a compute express link protocol;
receiving, from the remote computer, a request to onboard the remote computer, wherein the request adheres to a defined security protocol and data model architecture, and wherein the system is configured to remotely manage the remote computers as part of a hybrid cloud platform that comprises the remote computers;
authenticating the remote computer based on the request and according to the defined security protocol and data model architecture; and
implementing the shared memory pool for the remote computers.

2. The system of claim 1, wherein the operations further comprise:
enforcing a device security policy that applies to the shared memory pool across the remote computers.

3. The system of claim 2, wherein the operations further comprise:
sending the remote computer a hybrid cloud memory security policy, wherein the remote computer is configured to implement the device security policy based on the hybrid cloud memory security policy.

4. The system of claim 3, wherein the sending of the memory security policy to the remote computer is performed after the authenticating of the remote computer.

5. The system of claim 1, wherein the receiving the request from the remote computer to onboard the remote computer is performed in response to the remote computer being powered on.

6. The system of claim 1, wherein the operations further comprise:
receiving an indication of a memory map table of the remote computer from the remote computer, wherein the memory map table identifies authenticated devices for participation in memory pool configurations, and wherein the implementing of the shared memory pool for the remote computers is performed based on the indication of the memory map table.

7. The system of claim 6, wherein the operations further comprise:
decoding the indication of the memory map table to produce a decoded memory map table, and wherein the implementing of the shared memory pool for the remote computers is performed based on the decoded memory map table.

8. The system of claim 7, wherein the indication of the memory map table comprises a JavaScript object notation format, and wherein the decoded memory map table comprises a second format that differs from the JavaScript object notation format.

9. The system of claim 1, wherein the implementing of the shared memory pool for the remote computers comprises contacting a fabric management component of the remote computer, and wherein the fabric management component is configured to communicate with respective remote computers of the remote computers regarding the shared memory pool.

10. A method, comprising:
receiving, by a system comprising a processor, an inventory from a remote computer of remote computers, wherein the inventory indicates that the remote computer is configured to apply a shared memory pool to the remote computers;
receiving, by the system, a request from the remote computer to onboard the remote computer, wherein the request adheres to a specified security protocol and data model architecture, wherein the system is configured to remotely manage the remote computers as part of a hybrid cloud platform that comprises the remote computers;
authenticating, by the system, the remote computer based on the request and according to the specified security protocol and data model architecture; and
facilitating, by the system, application of the shared memory pool to the remote computers.

11. The method of claim 10, further comprising:
updating, by the system, a configuration of the shared memory pool.

12. The method of claim 10, further comprising:
monitoring, by the system, the shared memory pool.

13. The method of claim 10, further comprising:
managing, by the system, a security incident relating to usage of the shared memory pool.

14. The method of claim 10, wherein the shared memory pool is configured for usage according to a compute express link protocol.

15. A non-transitory computer-readable medium comprising instructions that, in response to execution, cause a system comprising a processor to perform operations, comprising:
receiving an inventory from a remote computer of remote computers, wherein the inventory indicates that the remote computer is configured to implement a shared memory pool with the remote computers;
receiving a request from the remote computer to onboard the remote computer, wherein the system is configured to remotely manage the remote computers as part of a hybrid cloud platform that comprises the remote computers;
authenticating the remote computer based on the request; and
implementing the shared memory pool for the remote computers.

16. The non-transitory computer-readable medium of claim 15, wherein the request adheres to a security protocol and data model architecture, and wherein the authenticating of the remote computer based on the request is performed according to the security protocol and data model architecture.

17. The non-transitory computer-readable medium of claim 15, wherein the operations further comprise:
receiving order data indicative of initiating a subscription for the remote computer.

18. The non-transitory computer-readable medium of claim 15, wherein the operations further comprise:
receiving an encoded binary indication of a memory map table from the remote computer, and wherein the implementing of the shared memory pool for the remote computers is performed based on the encoded binary indication of the memory map table.

19. The non-transitory computer-readable medium of claim 15, wherein the implementing of the shared memory pool for the remote computers comprises:
   instructing the remote computer to lock a memory device of the remote computer, to unlock the memory device of the remote computer, or to assign the memory device of the remote computer.

20. The non-transitory computer-readable medium of claim 15, wherein the shared memory pool is configured according to a compute express link protocol.

* * * * *